United States Patent
Yang et al.

(10) Patent No.: US 12,197,998 B2
(45) Date of Patent: Jan. 14, 2025

(54) IMAGE-BASED BARCODE DECODING

(71) Applicant: Maplebear Inc., San Francisco, CA (US)

(72) Inventors: Shiyuan Yang, Jersey City, NJ (US); Yilin Huang, Shanghai (CN); Wentao Pan, Shanghai (CN); Xiao Zhou, Shanghai (CN)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/398,739

(22) Filed: Dec. 28, 2023

(65) Prior Publication Data

US 2024/0135123 A1    Apr. 25, 2024

Related U.S. Application Data

(63) Continuation of application No. 17/703,076, filed on Mar. 24, 2022, now Pat. No. 12,050,960.

(60) Provisional application No. 63/165,693, filed on Mar. 24, 2021.

(51) Int. Cl.
*G06K 7/14*  (2006.01)
*G06T 7/10*  (2017.01)

(52) U.S. Cl.
CPC ............. *G06K 7/1413* (2013.01); *G06T 7/10* (2017.01); *G06F 2218/12* (2023.01); *G06T 2207/20081* (2013.01)

(58) Field of Classification Search
CPC ..... G06K 7/1456; G06K 7/146; G06K 7/1482
USPC ............................... 235/462.01, 462.08, 383
See application file for complete search history.

(56) References Cited

U.S. PATENT DOCUMENTS

| | | | |
|---|---|---|---|
| 8,011,586 B2* | 9/2011 | Sato | G06K 17/00 235/487 |
| 10,146,971 B1* | 12/2018 | Cansizoglu | G06K 7/10722 |
| 11,544,506 B2* | 1/2023 | Chaubard | G06T 7/11 |
| 11,587,216 B2* | 2/2023 | Zagaynov | G06N 20/20 |
| 2010/0012729 A1* | 1/2010 | Sato | G06K 17/00 235/462.09 |
| 2011/0155808 A1* | 6/2011 | Santos | G06K 7/146 235/462.15 |
| 2013/0094695 A1* | 4/2013 | He | G06V 10/245 382/103 |
| 2013/0193211 A1* | 8/2013 | Baqai | G06K 7/1456 235/462.04 |
| 2019/0220660 A1* | 7/2019 | Cali | G06V 30/40 |
| 2019/0325183 A1* | 10/2019 | Tscherepanow | G06T 7/73 |

(Continued)

OTHER PUBLICATIONS

United States Office Action, U.S. Appl. No. 17/703,076, filed Jun. 20, 2023, 13 pages.

*Primary Examiner* — Paultep Savusdiphol
(74) *Attorney, Agent, or Firm* — Fenwick & West LLP (57) ABSTRACT

A barcode decoding system decodes item identifiers from images of barcodes. The barcode decoding system receives an image of a barcode and rotates the image to a predetermined orientation. The barcode decoding system also may segment the barcode image to emphasize the portions of the image that correspond to the barcode. The barcode decoding system generates a binary sequence representation of the item identifier encoded in the barcode by applying a barcode classifier model to the barcode image, and decodes the item identifier from the barcode based on the binary sequence representation.

20 Claims, 5 Drawing Sheets

(56) References Cited

U.S. PATENT DOCUMENTS

| | | | |
|---|---|---|---|
| 2021/0192289 A1* | 6/2021 | Chaubard | G06V 10/774 |
| 2021/0224969 A1* | 7/2021 | Zagaynov | G06V 10/764 |
| 2021/0295078 A1* | 9/2021 | Barkan | G06V 30/2247 |
| 2021/0343030 A1* | 11/2021 | Sagonas | G06T 7/30 |
| 2021/0368096 A1* | 11/2021 | Stawiaski | G06V 10/764 |
| 2021/0397916 A1* | 12/2021 | Satish | G06K 19/06037 |
| 2022/0101259 A1* | 3/2022 | Simpson | G06V 30/1465 |
| 2022/0198550 A1* | 6/2022 | Meidar | G06Q 20/20 |
| 2023/0081912 A1* | 3/2023 | Chaubard | G06T 7/11 382/103 |

* cited by examiner

IMAGE-BASED BARCODE DECODING

CROSS REFERENCE TO RELATED APPLICATION

This application is a continuation of pending U.S. patent application Ser. No. 17/703,076, "Image-Based Barcode Decoding" and filed Mar. 24, 2022, which claims the benefit of U.S. Provisional Patent Application No. 63/165,693, entitled "Methods and Systems for Image-Based Barcode Decoding" and filed on Mar. 24, 2021, each of which are incorporated by reference herein in its entirety.

BACKGROUND

A barcode is a set of parallel vertical lines of varying widths and spacings that encode an alpha-numeric value. Barcodes are commonly used to encode item identifiers for items to which the barcodes are coupled. The barcode can be used by a point-of-sale system to quickly identify the item to expedite a user's checkout.

Barcodes are commonly decoded by specialized hardware called barcode scanners. However, these scanners are generally single purpose, meaning they are not used for any other function other than decoding barcodes. Thus, a system that relies on barcode scanners to scan barcodes must include this additional hardware, which can increase the expense and size of a system. Additionally, barcode scanners typically require a user to align the barcode with the barcode scanner at a close distance, meaning they can be inconvenient for a user to use.

Some systems may use image data captured by cameras to decode barcodes. These systems may apply computer vision techniques to read the barcode depicted in images. However, these systems generally work by identifying the portion of the image that corresponds to the barcode and manipulating that portion of the image to make the barcode readable by a conventional barcode decoding process. These systems can be ineffective at decoding barcodes because the resulting images of the barcode are often inaccurate or difficult to read through a typical barcode decoding process.

SUMMARY

A barcode decoding system predicts item identifiers encoded in barcodes depicted in images of those barcodes. The barcode decoding system may receive a barcode image that depicts a barcode coupled to an item. The barcode depicted in the barcode image may encode an item identifier that is associated with the item. The barcode decoding system may rotate the barcode image to a pre-determined orientation and may segment the barcode image to emphasize the barcode in the barcode image.

The barcode decoding system applies a barcode classifier model to the barcode image. The barcode classifier model generates a binary sequence representation of the item identifier based on the barcode image. A binary sequence representation is a sequence of bits that represent the item identifier encoded in the barcode. For example, the binary sequence representation may represent which bars in the barcode are black and which bars are white. The barcode decoding system may apply a barcode decoding process to the binary sequence representation to decode the item identifier. The barcode decoding system may then add the item associated with the item identifier to a shopping list of a user of the barcode decoding system.

By using a barcode classifier model to decode an item identifier from a barcode image, the barcode decoding system can decode item identifiers from barcodes without the use of specialized hardware. Instead, the barcode decoding system can rely on images captured by standard cameras to decode item identifiers. Additionally, as noted above, the barcode decoding system treats the barcode decoding problem as a classification problem, whereas conventional systems try to generate a "correct" image of the barcode based on an imperfect barcode image. By generating a binary sequence representation for the item identifier directly rather than a "correct" barcode image which is then scanned, the barcode decoding system avoids intermediate inaccuracies from possible errors in the "correct" barcode image.

DETAILED DESCRIPTION

Figure 1:
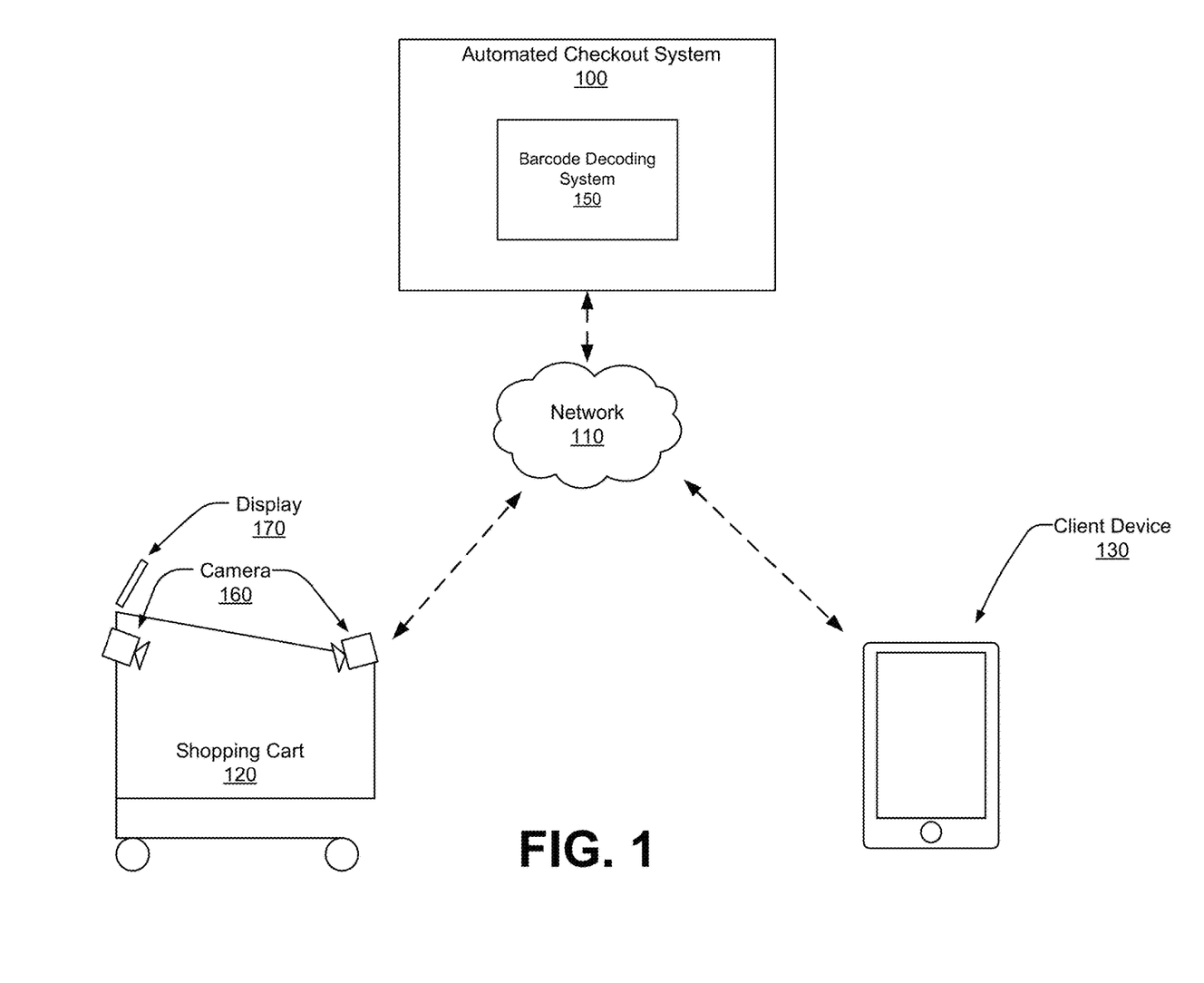
FIG. 1 illustrates an example system environment for an automated checkout system, in accordance with some embodiments.

FIG. 1 illustrates an example system environment for an automated checkout system 100, in accordance with some embodiments. The system environment illustrated in FIG. 1 includes an automated checkout system 100, a network 110, a shopping cart 120, and a client device 130. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The automated checkout system 100 allows a customer at a brick-and-mortar store to complete a checkout process in which items are scanned and paid for without having to go through a human cashier. The automated checkout system 100 receives data describing a user's shopping trip in a store and generates a shopping list based on items that the user has selected. For example, the automated checkout system 100 may receive image data from a shopping cart 120 and may determine, based on the image data, which items the user has added to their cart. When the user indicates that they are done shopping at the store, the automated checkout system 100 facilitates a transaction between the user and the store for the user to purchase the items that they have selected.

The automated checkout system 100 may include a barcode decoding system 150. The barcode decoding system 150 receives barcode images from the client device 130 or the shopping cart 120 and determines an item identifier that is encoded in the barcode depicted by the barcode image. A barcode image is an image of a barcode. The barcode depicted by the barcode image may represent an item identifier (e.g., a SKU) for an item to which the barcode is coupled. The item identifier is an alphanumeric value that identifies an item. For example, the bar code may be printed on and/or otherwise coupled to a soda can, and may represent an item identifier for the soda can. A barcode decoding system 150, in accordance with some embodiments, is discussed in further detail below with regards to FIG. 2.

As noted above, while the automated checkout system 100 is depicted in FIG. 1 as separate from the shopping cart 120 and the client device 130, some or all of the functionality of the automated checkout system 100 may be performed by the shopping cart 120 or the client device 130. For example, the shopping cart 120 or the client device 130 may store a user's shopping list and update the shopping list based on data gathered by the shopping cart 120 or the client device 130.

A shopping cart 120 is a vessel that a user can use to hold items as the user travels through a store. The shopping cart 120 may include one or more cameras 160 that capture image data of the shopping cart's basket. The image data captured by the cameras 160 may be used by the automated checkout system 100 to identify items that the user adds to the shopping cart 120 and to update the user's shopping list as the user shops at the store. In some embodiments, the cameras 160 capture barcode images depicting barcodes coupled to items.

The shopping cart 120 includes a display 170 through which the user can interact with the automated checkout system 100. For example, the user can use a user interface presented on the display 170 to adjust the items in their shopping list or to provide payment information for a checkout process.

A user can also interact with the automated checkout system 100 through a client device 130. The client device 130 can be a personal or mobile computing device, such as a smartphone, a tablet, a laptop computer, or desktop computer. In some embodiments, the client device 130 executes a client application that uses an application programming interface (API) to communicate with the automated checkout system 100 through the network 110.

The user may interact with the shopping cart 120 or the automated checkout system 100 through the client device 130. For example, the user may use the client device 130 to capture image data of item that the user is selecting for purchase, and the client device 130 may provide the image data to the automated checkout system 100 to identify the items that the user is selecting. Additionally, the user may use the client device 130 to manually adjust their shopping list and the client device 130 may instruct the automated checkout system 100 to make the adjustments to the shopping list indicated by the user. In some embodiments, the client device 130 captures barcode images of barcodes coupled to items through a camera of the client device 130.

In some embodiments, a user who interacts with the shopping cart 120 or the client device 130 may be a shopper for an online concierge system. The shopper is a user who collects items from a store on behalf of a user of the online concierge system. For example, a user may submit a list of items that they would like to purchase. The online concierge system may transmit that list to a shopping cart 120 or a client device 130 used by a shopper. The shopper may use the shopping cart 120 or the client device 130 to add items to the user's shopping list. When the shopper has gathered the items that the user has requested, the shopper may perform a checkout process through the shopping cart 120 or client device 130 to charge the user for the items. U.S. Pat. No. 11,195,222, entitled "Determining Recommended Items for a Shopping List" and issued Dec. 7, 2021 describes online concierge systems in more detail, and the contents of this patent are incorporated by reference herein in their entirety.

The shopping cart 120 and client device 130 can communicate with the automated checkout system 100 via the network 110, which may comprise any combination of local area and wide area networks employing wired or wireless communication links. In some embodiments, the network 110 uses standard communications technologies and protocols. For example, the network 110 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 110 may be represented using any format, such as hypertext markup language (HTML) or extensible markup language (XML). In some embodiments, all or some of the communication links of the network 110 may be encrypted.

Figure 2:
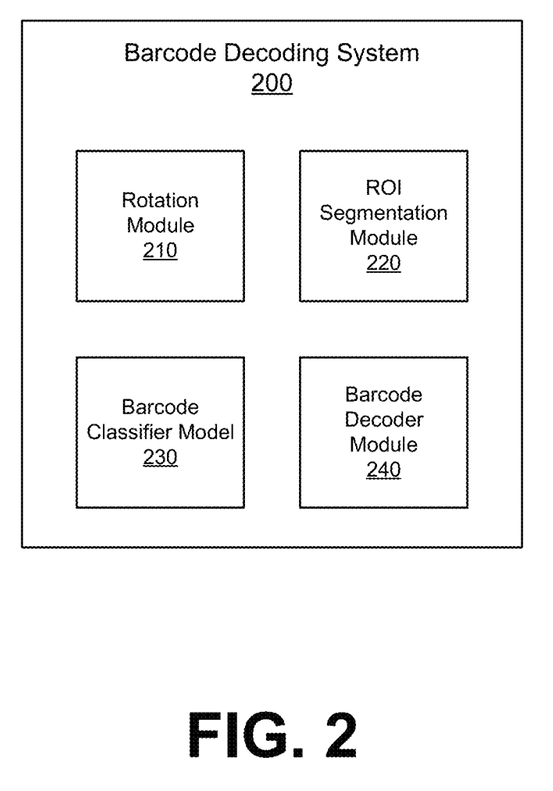
FIG. 2 illustrates an example system architecture of a barcode decoding system, in accordance with some embodiments.

FIG. 2 illustrates an example system architecture of a barcode decoding system 200, in accordance with some embodiments. The barcode decoding system 200 illustrated in FIG. 2 includes a rotation module 210, a region of interest (ROI) segmentation module 220, a barcode classifier model 230, and a barcode decoder module 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention. In some embodiments, the barcode decoding system 200 of FIG. 2 represents a more detailed illustration of the barcode decoding system 150 of FIG. 1. For example, the functionality of barcode decoding system 150 of FIG. 1 may include some or all of the functionality of the barcoding system 200 of FIG. 2.

The rotation module 210 rotates barcode images to a pre-determined orientation. For example, the rotation module 210 may rotate a received barcode image such that the barcode depicted by the barcode image is horizontal. The rotation module 210 may rotate a barcode image by applying a rotation model to the barcode image. A rotation model is a machine-learning model (e.g., a neural network) that is trained to rotate barcode images to a pre-determined orientation. For example, the rotation model may include a convolutional neural network (CNN)-based regression model trained to predict an angle of rotation of a barcode image and to rotate the image based on the angle of rotation.

A region-of-interest (ROI) segmentation module 220 generates segmented barcode images. A segmented barcode image is a barcode image where background information has been removed from the barcode image. For example, if the barcode image depicts a barcode coupled to a soda can, the ROI segmentation module 220 may remove the portions of the barcode image that correspond to the soda can and generate a segmented barcode image that only depicts the barcode. In some embodiments, the ROI segmentation module 220 is applied to a rotated barcode image generated by the rotation module 210. The ROI segmentation module 220 may generate segmented barcode images by generating a segmentation mask for the barcode image and applying the mask to the barcode image.

The ROI segmentation module 220 may apply a segmentation model to a barcode image to generate a segmented barcode image. A segmentation model is a machine-learning model (e.g., a neural network) that is trained to segment barcode images or rotated barcode images. For example, the segmentation model may include an encoder-decoder based semantic segmentation model that is trained to generate a pixel-wise mask that identifies the portion of the barcode image that depicts the barcode.

In some embodiments, rather than having background information removed from the barcode image, the ROI segmentation module 220 uses an attention mechanism to emphasize portions of the barcode image that are related to the barcode and to deemphasize portions of the barcode image that are not related to the barcode. For example, in using the attention mechanism, a segmentation model used by the ROI segmentation module 220 may use a CNN that is trained to emphasize pixels in the barcode image that represent the barcode and deemphasize pixels that do not represent the barcode (e.g., by applying a greater weight to pixels that represent the barcode than pixels that do not). Additionally, the ROI segmentation module 220 may generate embeddings for regions of the barcode image (e.g., nine regions arranged in a three-by-three grid) and may train a segmentation model used by the ROI segmentation module 220 to emphasize certain regions over others.

The barcode classifier model 230 generates a binary sequence representation for an item identifier based on a barcode image. A binary sequence representation is a sequence of bits that encode the item identifier in accordance with a barcode encoding scheme. A binary sequence representation may represent, through bits, which bars in the barcode are white and which bars in the barcode are black. For example, for a UPC-A barcode, the binary sequence representation may represent which bars are black or white within each seven-bar sequence of the barcode. Alternatively, the binary sequence representation may represent the width of generalized bars that are made up by individual bars. The binary sequence representation may use a barcode encoding process for the barcode to encode the barcode in the sequence of bits. For example, the binary sequence representation may use EAN-13, EAN-8, UPC-A, UPC-E, GS1-128, or ISBN. In some embodiments, the binary sequence representation includes a set of filler bits that allows the binary sequence representation to maintain a consistent length for each barcode encoding scheme. The binary sequence representation may include a set of bits that indicate which barcode encoding scheme was used to encode the item identifier as a barcode. The barcode classifier model 230 may generate a binary sequence representation for a barcode image that has been rotated or segmented by the rotation module 210 or the ROI segmentation module 220, respectively.

In some embodiments, the barcode classifier model 230 uses a connectionist temporal classification (CTC) inference algorithm to generate a binary sequence representation for a barcode image. For example, the barcode classifier model 230 may generate binary predictions for a sequence of segments of the barcode image and apply a CTC decoder to generate a binary sequence representation for the barcode image. Similarly, the barcode classifier model 230 may be trained based on a CTC loss function. For example, the barcode classifier model 230 may receive training examples with barcode images and generate binary sequence representations for the training barcode images. The generated binary sequence representations may be compared to ground-truth binary sequence representations and the performance of the barcode classifier model 230 may be determined based on a CTC loss function. The barcode classifier model may be updated based on the score generated by the CTC loss function. As noted above, the barcode classifier model may use a CTC inference algorithm to generate binary sequence representations for barcode images that have been rotated or segmented.

The barcode decoder module 240 decodes the binary sequence representation to determine the item identifier encoded in the barcode of the barcode image. For example, the barcode decoder module 240 may apply a barcode decoding process to the binary sequence representation to determine the item identifier. The barcode decoder module 240 may determine which barcode decoder process to apply to the binary sequence representation based on an encoding indicator in the binary sequence presentation. The barcode decoder module 240 may then apply indicated barcode decoder process to the binary sequence representation to determine the item identifier.

Figure 3:
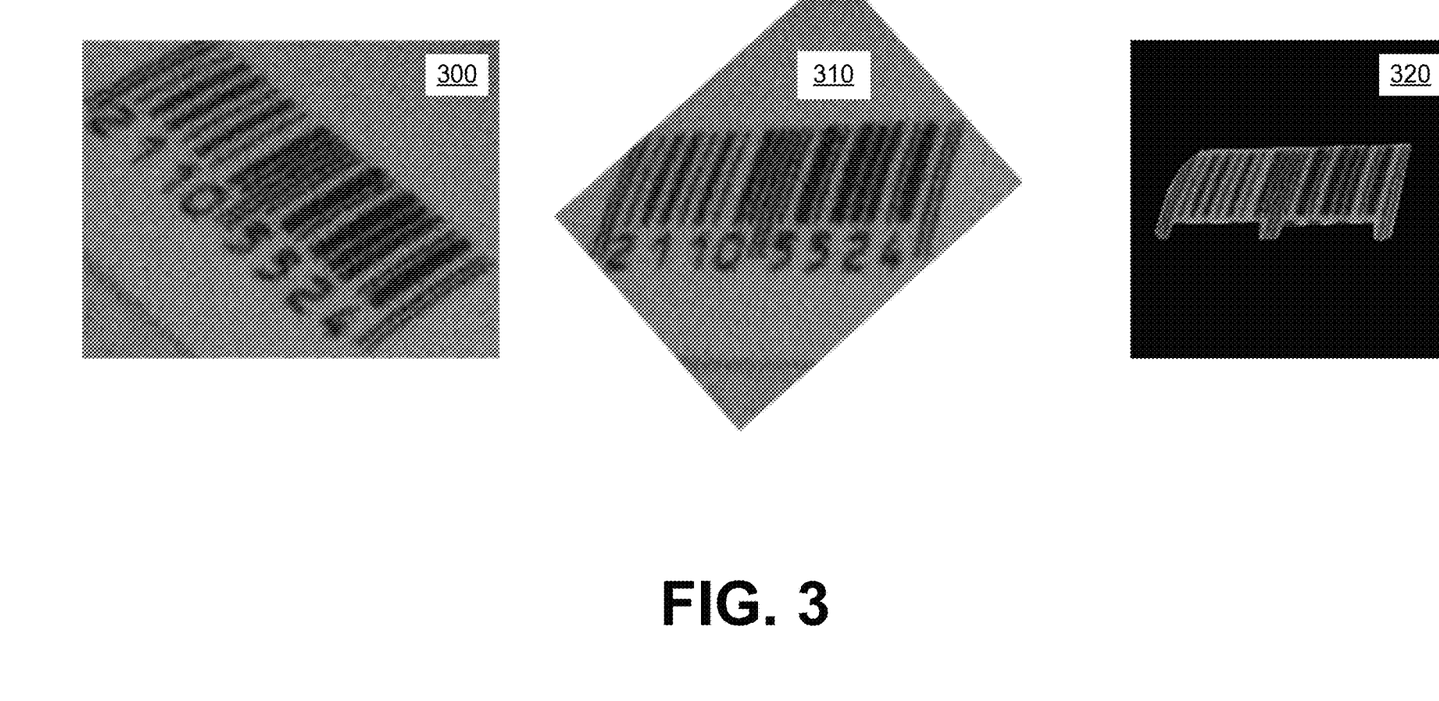
FIG. 3 illustrates an example barcode image, an example rotated barcode image, and an example segmented barcode image, in accordance with some embodiments.

FIG. 3 illustrates an example barcode image 300, an example rotated barcode image 310, and an example segmented barcode image 320, in accordance with some embodiments. In FIG. 3, the rotated barcode image 310 is the barcode image 300 rotated to a horizontal pre-determined orientation, though other embodiments may rotate the barcode image 300 to a different orientation. Additionally, in FIG. 3, the segmented barcode image 320 is a segmented image generated based on the rotated barcode image 310, though in other embodiments, the segmented barcode image 320 may be generated based on the barcode image 300.

Figure 4:
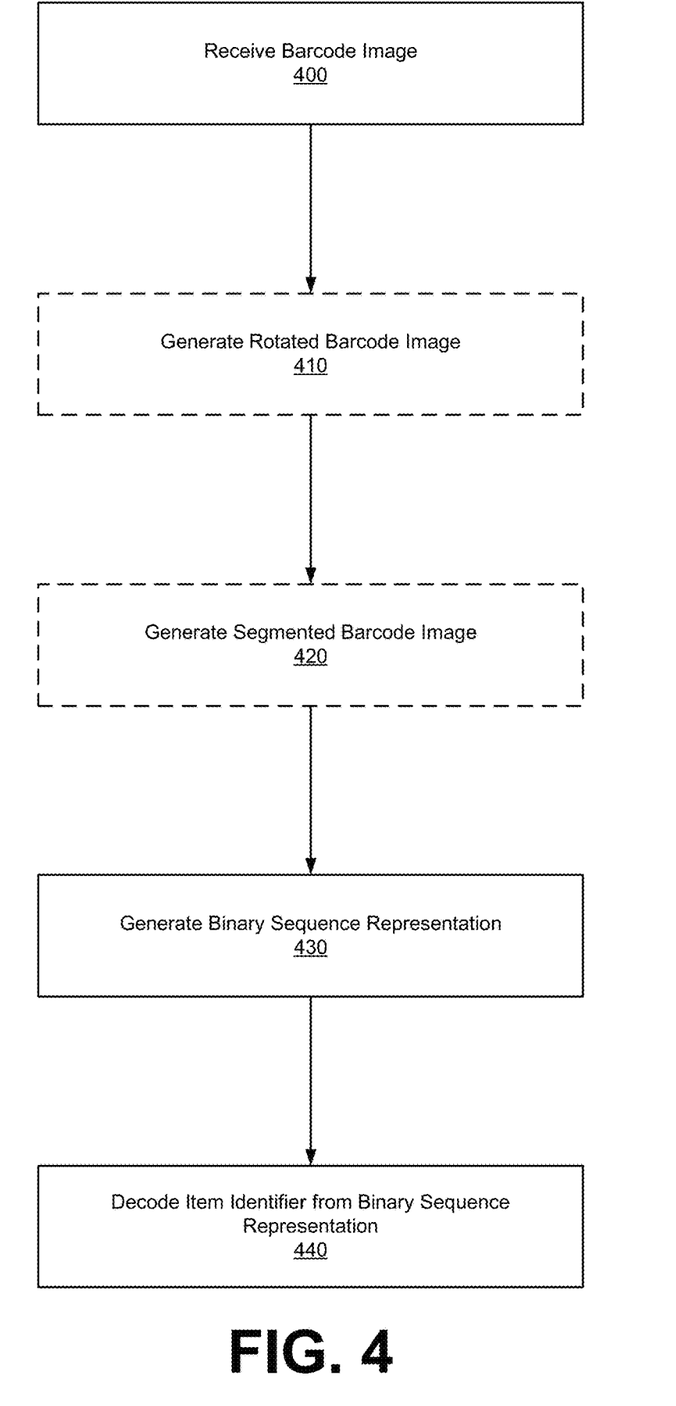
FIG. 4 is a flowchart for a method of decoding a barcode depicted in a barcode image, in accordance with some embodiments.

FIG. 4 is a flowchart for a method of decoding a barcode depicted in a barcode image, in accordance with some embodiments. Alternative embodiments may include more, fewer, or different steps from those illustrated in FIG. 4, and the steps may be performed in a different order from that illustrated in FIG. 4. Additionally, each of these steps may be performed automatically by the barcode decoding system without human intervention.

The barcode decoding system (e.g., barcode decoding system 200) receives 400 a barcode image depicting a barcode. The barcode depicted by the barcode image represents an item identifier for an item. The barcode may be an encoding of the item identifier in accordance with a barcode encoding process (e.g., UPC-A). The barcode decoding system may receive the barcode image from a camera of a client device or a shopping cart.

In some embodiments, the barcode decoding system generates 410 a rotated barcode image based on the barcode image. The rotated barcode image is a rotated version of the barcode image, wherein the barcode image is rotated to a pre-determined orientation. For example, the barcode decoding system may rotate the barcode image such that the barcode depicted by the barcode image is horizontal. The barcode decoding system may generate the rotated barcode image by applying a rotation model to the barcode image, where the rotation model is a machine-learning model trained to rotate barcode images to a pre-determined orientation.

In some embodiments, the barcode decoding system generates 420 a segmented barcode image based on the received barcode image or based on a rotated barcode image. The segmented barcode image is a barcode image where background information around the barcode has been filtered out. For example, the barcode decoding system may generate a barcode mask that filters out the background around the barcode and may apply the mask to the barcode image. The barcode decoding system may generate the segmented barcode image by applying a segmentation model to the barcode image, where the segmentation model is a machine-learning model that is trained to generate segmented barcode images based on barcode images.

The barcode decoding system generates 430 a binary sequence representation for the barcode depicted by the barcode image. The binary sequence representation of the barcode is a sequence of bits that encode the item identifier in accordance with a barcode encoding scheme. For example, the binary sequence representation may represent, through bits, the location of black and white bars of the barcode. The barcode decoding system generates the binary sequence representation by applying a barcode classifier model to the barcode image, rotated barcode image, or the segmented barcode image. The barcode classifier model is a machine-learning model that is trained to generate binary sequence representations based on barcode images. The barcode classifier model may be a classifier model trained to generate binary sequence representations. For example, the barcode classifier model may use a CTC inference algorithm to generate binary sequence representations.

The barcode decoding system decodes 440 the item identifier from the binary sequence representation. For example, the barcode decoding system may apply a barcode decoding process to the binary sequence representation to decode the item identifier. The barcode decoding system may then use the decoded item identifier to add the item associated with the item identifier to a user's shopping list.

Figure 5:
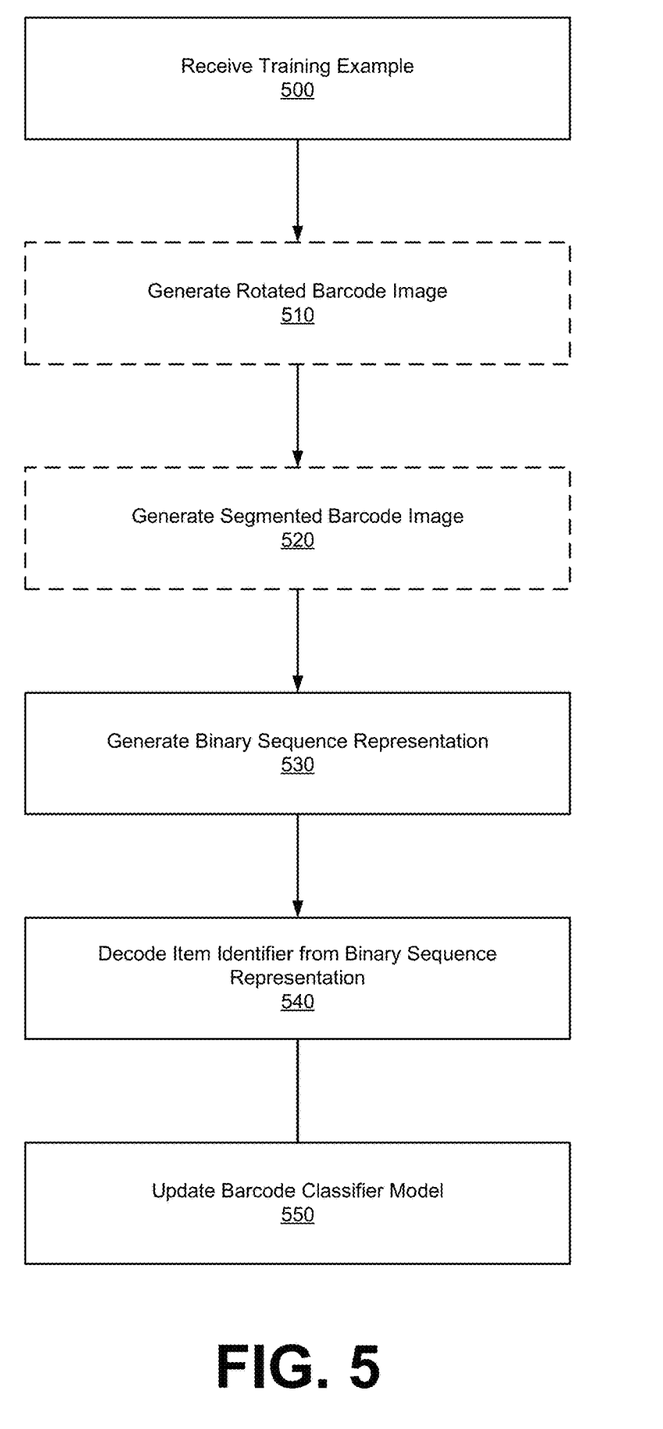
FIG. 5 is a flowchart for a method for training a barcode classifier model based on a training example, in accordance with some embodiments.

FIG. 5 is a flowchart for a method for training a barcode classifier model based on a training example, in accordance with some embodiments. Alternative embodiments may include more, fewer, or different steps from those illustrated in FIG. 5, and the steps may be performed in a different order from that illustrated in FIG. 5. Additionally, each of these steps may be performed automatically by the barcode decoding system without human intervention.

The barcode decoding system (e.g., barcode decoding system 200) receives 500 a training example for training the barcode classifier model. The training example includes a barcode image depicting a barcode. The barcode depicted by the barcode image represents an item identifier for an item. The barcode may be an encoding of the item identifier in accordance with a barcode encoding process (e.g., UPC-A). The training example also includes a label that indicates a ground-truth item identifier represented by the barcode in the barcode image.

In some embodiments, the barcode decoding system generates 510 a rotated barcode image based on the barcode image. The rotated barcode image is a rotated version of the barcode image, wherein the barcode image is rotated to a pre-determined orientation. For example, the barcode decoding system may rotate the barcode image such that the barcode depicted by the barcode image is horizontal. The barcode decoding system may generate the rotated barcode image by applying a rotation model to the barcode image, where the rotation model is a machine-learning model trained to rotate barcode images to a pre-determined orientation.

In some embodiments, the barcode decoding system generates 520 a segmented barcode image based on the received barcode image or based on a rotated barcode image. The segmented barcode image is a barcode image where background information around the barcode has been filtered out. For example, the barcode decoding system may generate a barcode mask that filters out the background around the barcode and may apply the mask to the barcode image. The barcode decoding system may generate the segmented barcode image by applying a segmentation model to the barcode image, where the segmentation model is a machine-learning model that is trained to generate segmented barcode images based on barcode images.

The barcode decoding system generates 530 a binary sequence representation for the barcode depicted by the barcode image. The binary sequence representation of the barcode is a sequence of bits that encode a predicted item identifier in accordance with a barcode encoding scheme. For example, the binary sequence representation may represent, through bits, the location of black and white bars of the barcode. The barcode decoding system generates the binary sequence representation by applying a barcode classifier model to the barcode image, rotated barcode image, or the segmented barcode image. The barcode classifier model is a machine-learning model that is trained to generate binary sequence representations based on barcode images. The barcode classifier model may be a classifier model trained to generate binary sequence representations. For example, the barcode classifier model may use a CTC inference algorithm to generate binary sequence representations.

The barcode decoding system decodes 540 the predicted item identifier from the binary sequence representation. For example, the barcode decoding system may apply a barcode decoding process to the binary sequence representation to decode the item identifier. The barcode decoding system updates 550 the barcode classifier model based on the predicted item identifier and the ground-truth item identifier of the training example. For example, the barcode decoding system may apply a loss function to the predicted item identifier and the ground-truth item identifier to score the performance of the barcode classifier model. In some embodiments, the barcode decoding system applies a CTC loss function to score the performance of the barcode classifier model. The barcode decoding system may use the comparison of the predicted item identifier and the ground-truth item identifier to update weights used by the binary classifier model to update the binary classifier model based on the training example. In some embodiments, the barcode decoding system uses a back propagation process to update the weights of the barcode classifier model.

Additional Considerations

The foregoing description of the embodiments has been presented for the purpose of illustration; it is not intended to be exhaustive or to limit the patent rights to the precise pages disclosed. Many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The weights may be stored on one or more computer-readable media, and are used by a system when applying the machine-learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A non-transitory computer readable medium storing a set of parameters for a barcode classifier model, wherein the set of parameters for the barcode classifier model is produced by a process comprising:
    accessing a set of training examples for the barcode classifier model, wherein each training example comprises:
        an image depicting a barcode, wherein the barcode encodes an item identifier for an item using a sequence of bars, wherein each bar corresponds to a binary encoding of the item identifier; and
        a label indicating an item identifier encoded by the barcode depicted in the image;
    initializing the barcode classifier model;
    training the barcode classifier model by iteratively updating a set of parameters for the barcode classifier model based on each training example in the set of training example for the barcode classifier model, wherein training the barcode classifier model based on a training example comprises:
        generating a rotated image of the barcode by applying a rotation model to the barcode image of the training example, wherein the rotation model comprises a machine-learning model trained to rotate barcode images to a pre-determined orientation;
        generating a segmented image of the barcode by applying a segmentation model to the rotated image of the barcode, wherein the segmentation model comprises a machine-learning model trained to remove backgrounds from rotated images of barcodes;
        generating a predicted binary sequence representation of the item identifier for the item of the training example by applying the barcode classifier model to the segmented image, wherein the binary sequence representation comprises a set of binary predictions, wherein each of the binary predictions corresponds to a bar of the sequence of bars of the barcode and indicates a probabilistic prediction of a corresponding binary value of the binary encoding of the item identifier;
        decoding a predicted item identifier based on the predicted binary sequence representation;
        computing a loss score by applying a loss function to the predicted item identifier and the item identifier encoded by the barcode; and
        updating a set of parameters for the barcode classifier model by applying a backpropagation process to the barcode classifier model using the loss score; and
    storing a final set of parameters for the barcode classifier model to the computer-readable medium.

2. The computer-readable medium of claim 1, wherein a training example in the set of training examples comprises an image captured by a camera coupled to a client device of a user.

3. The computer-readable medium of claim 1, wherein a training example in the set of training examples comprises an image captured by a camera coupled to a shopping cart and depicting an item within a basket of the shopping cart.

4. The computer-readable medium of claim 1, wherein the barcode classifier model generates the binary sequence of the item identifier by applying a connectionist temporal classification inference algorithm to the segmented image.

5. The computer-readable medium of claim 4, wherein the loss function is a connectionist temporal classification loss function.

6. The computer-readable medium of claim 1, wherein the segmentation model comprises an attention mechanism.

7. The computer-readable medium of claim 1, wherein the pre-determined orientation is horizontal.

8. The computer-readable medium of claim 1, wherein decoding the predicted item identifier from the binary second representation comprises translating the binary sequence representation to an alphanumeric representation of the predicted item identifier.

9. A non-transitory computer readable medium storing a set of parameters for a barcode classifier model, wherein the set of parameters for the barcode classifier model is produced by a process comprising:
accessing a set of training examples for the barcode classifier model, wherein each training example comprises:
an image depicting a barcode, wherein the barcode encodes an item identifier for an item using a sequence of bars, wherein each bar corresponds to a binary encoding of the item identifier; and
a label indicating an item identifier encoded by the barcode depicted in the image;
initializing the barcode classifier model;
training the barcode classifier model by iteratively updating a set of parameters for the barcode classifier model based on each training example in the set of training example for the barcode classifier model, wherein training the barcode classifier model based on a training example comprises:
generating a predicted binary sequence representation of the item identifier for the item of the training example by applying the barcode classifier model to the image of the training example, wherein the binary sequence representation comprises a set of binary predictions, wherein each of the binary predictions corresponds to a bar of the sequence of bars of the barcode and indicates a probabilistic prediction of a corresponding binary value of the binary encoding of the item identifier;
decoding a predicted item identifier based on the predicted binary sequence representation;
computing a loss score by applying a loss function to the predicted item identifier and the item identifier encoded by the barcode; and
updating a set of parameters for the barcode classifier model by applying a backpropagation process to the barcode classifier model using the loss score; and
storing a final set of parameters for the barcode classifier model to the computer-readable medium.

10. The computer-readable medium of claim 9, wherein a training example in the set of training examples comprises an image captured by a camera coupled to a client device of a user.

11. The computer-readable medium of claim 9, wherein a training example in the set of training examples comprises an image captured by a camera coupled to a shopping cart and depicting an item within a basket of the shopping cart.

12. The computer-readable medium of claim 9, wherein the barcode classifier model generates the binary sequence of the item identifier by applying a connectionist temporal classification inference algorithm to the image.

13. The computer-readable medium of claim 12, wherein the loss function is a connectionist temporal classification loss function.

14. The computer-readable medium of claim 9, wherein training the barcode classifier model based on a training example further comprises:
generating a segmented image of the barcode by applying a segmentation model to the image of the training example, wherein the segmentation model comprises a machine-learning model trained to remove backgrounds from images of barcodes; and
generating the predicted binary sequence representation of the item identifier by applying the barcode classifier model to the segmented image.

15. The computer-readable medium of claim 9, wherein the segmentation model comprises an attention mechanism.

16. The computer-readable medium of claim 9, wherein training the barcode classifier model based on a training example further comprises:
generating a rotated image of the barcode by applying a rotation model to the barcode image of the training example, wherein the rotation model comprises a machine-learning model trained to rotate barcode images to a pre-determined orientation; and
generating the predicted binary sequence representation of the item identifier by applying the barcode classifier model to the segmented image.

17. The computer-readable medium of claim 9, wherein the pre-determined orientation is horizontal.

18. The computer-readable medium of claim 9, wherein decoding the predicted item identifier from the binary second representation comprises translating the binary sequence representation to an alphanumeric representation of the predicted item identifier.

19. A method for training a barcode classifier model comprising:
accessing a set of training examples for the barcode classifier model, wherein each training example comprises:
an image depicting a barcode, wherein the barcode encodes an item identifier for an item using a sequence of bars, wherein each bar corresponds to a binary encoding of the item identifier; and
a label indicating an item identifier encoded by the barcode depicted in the image;
initializing the barcode classifier model;
training the barcode classifier model by iteratively updating a set of parameters for the barcode classifier model based on each training example in the set of training example for the barcode classifier model, wherein training the barcode classifier model based on a training example comprises:
generating a rotated image of the barcode by applying a rotation model to the barcode image of the training example, wherein the rotation model comprises a machine-learning model trained to rotate barcode images to a pre-determined orientation;

generating a segmented image of the barcode by applying a segmentation model to the rotated image of the barcode, wherein the segmentation model comprises a machine-learning model trained to remove backgrounds from rotated images of barcodes;

generating a predicted binary sequence representation of the item identifier for the item of the training example by applying the barcode classifier model to the segmented image, wherein the binary sequence representation comprises a set of binary predictions, wherein each of the binary predictions corresponds to a bar of the sequence of bars of the barcode and indicates a probabilistic prediction of a corresponding binary value of the binary encoding of the item identifier;

decoding a predicted item identifier based on the predicted binary sequence representation;

computing a loss score by applying a loss function to the predicted item identifier and the item identifier encoded by the barcode; and updating a set of parameters for the barcode classifier model by applying a backpropagation process to the barcode classifier model using the loss score; and storing a final set of parameters for the barcode classifier model to a computer-readable medium.

20. The method of claim 19, wherein a training example in the set of training examples comprises an image captured by a camera coupled to a shopping cart and depicting an item within a basket of the shopping cart.

* * * * *